United States Patent Office.

VICTOR AMÉDÉE TAGANT, OF MULHOUSE, FRANCE, AND PETER SCHÜLER, OF BIENNE, SWITZERLAND.

Letters Patent No. 93,923, dated August 17, 1869.

IMPROVED "SALT-STONE" FOR SALTING CATTLE AND OTHER ANIMALS.

The Schedule referred to in these Letters Patent and making part of the same.

*To all whom it may concern:*

Be it known that we, VICTOR AMÉDÉE TAGANT, of Mulhouse, in the Empire of France, and PETER SCHÜLER, of Bienne, Canton of Berne, Switzerland, have invented a new and improved "Alolith" or Salt-Stone; and we do hereby declare that the following is a full and exact description of the same.

The nature of this "alolith," or salt-stone, consists of ninety-three (93) parts of salt, either sea or rock-salt; one (1) part of ochre; three (3) parts of hydraulic chalk or common lime, (*Calcis hydras*;) and three (3) parts of Glauber's salt, (sulphate of soda,) (*Natr. sulph.*)

These materials are ground or powdered in any suitable mill, and are well mixed together, and then pressed in the shape of a brick, either square, oval, or round. We prefer to make the same about $9 \times 4\frac{1}{2} \times 3$ inches.

These stones ought to be made under a great pressure, and are, when pressed, allowed to dry in a moderately-heated drying-room.

This alolith, or salt-stone, forms a substitute for the common use of mixing salt with food of animals, such as horses, cattle, sheep, pigs, &c.

The great fondness of animals for salt is well known, and their natural instinct will lead them, whenever desired, to this stone, which is to be fastened near the crib, manger, or rack, containing their usual food, or at some convenient place in the field, so that the animal may easily lick the stone.

By mixing common salt with the food of the animal, the same receives either too much or too little, particularly as the quantity useful and necessary for different animals varies, and even for the same species of animal, changes very much, according to its particular nature and constitution, while, by the use of this "alolith," each animal is left to its own instinct, which is the best judge of the quantity which it requires, which varies according to its age, size, constitution, and the nature of its general food.

The great use of salt to the animal creation is well known to graziers and farmers. Horses are very fond of it, and it increases their vigor, mettle, and sprightliness. Cows give more milk when supplied with it, and cattle increase in size and give better and more juicy meat, while its use by sheep considerably improves the quantity and quality of the wool.

The several materials mixed with the salt in the formation of our alolith, or saltstone, are all of more or less value to the general health of the animal.

The ochre increases and improves the blood. The lime is of great use in the formation of the bones, (ossification,) and the Glauber's salt regulates and keeps the digestive organs in a healthy condition.

What we claim as our invention, and desire to secure by Letters Patent, is—

The herein-described alolith, composed of the ingredients, in the manner and for the purpose as above set forth.

A. TAGANT.
P. SCHÜLER.

Witnesses:
BASLER, *Professeur à l'École Professionnelle.*
CONSTANT BOREL.